Jan. 2, 1962 H. D. HARFORD 3,015,735

FLIP-FLOP WITH EACH SIDE CROSS-COUPLED TO OTHER SIDE BY CAPACITOR AND EMITTER FOLLOWER IN PARALLEL

Filed Dec. 23, 1957

INVENTOR.
HENRY D. HARFORD
BY John P. Dainty
ATTORNEY

United States Patent Office 3,015,735

Patented Jan. 2, 1962

3,015,735

FLIP-FLOP WITH EACH SIDE CROSS-COUPLED TO OTHER SIDE BY CAPACITOR AND EMITTER FOLLOWER IN PARALLEL

Henry Douglas Harford, Vestal, N.Y., assignor to International Business Machines Corporation, New York, N.Y., a corporation of New York Filed Dec. 23, 1957, Ser. No. 704,638
3 Claims. (Cl. 307—88.5)

This invention relates to improvements in bistable devices and more particularly to improvements in transistor trigger circuits of the four element type.

An object of this invention is to provide improved cross coupling for a four element bistable device.

Another object is to provide a bistable device with improved capacity driving capabilities.

Another object is to provide a four element transistor trigger with improved capacity driving capabilities while operating with narrow input pulses and short input time constants.

Still another object is to provide a four element transistor trigger of improved switching time.

A further object is to provide an improved four element transistor trigger capable of driving an unbalanced capacitive loading.

Another object is to provide a four element transistor trigger of improved sensitivity.

A still further object is to provide a four element transistor trigger capable of operating at higher frequencies.

According to a preferred embodiment of the present invention a first transistor inverter stage drives a first emitter follower output stage with cross coupling to a second inverter stage driving a second emitter follower output stage which in turn is cross coupled back to the first inverter stage. The improvements are obtained by employing an additional intermediate stage coupling between inverter stages to provide amplified transient signals at the inverter inputs which augment the initial transients from the input signal. A second transient decay, considerably greater than that caused by the original input, is thus provided to extend the maximum allowable switching time of the trigger. This second transient is directly dependent on the intermediate coupling.

Other objects of the invention will be pointed out in the following description and claims and illustrated in the accompanying drawings, which disclose, by way of examples, the principle of the invention and the best mode, which has been contemplated, of applying that principle.

Figure 1:
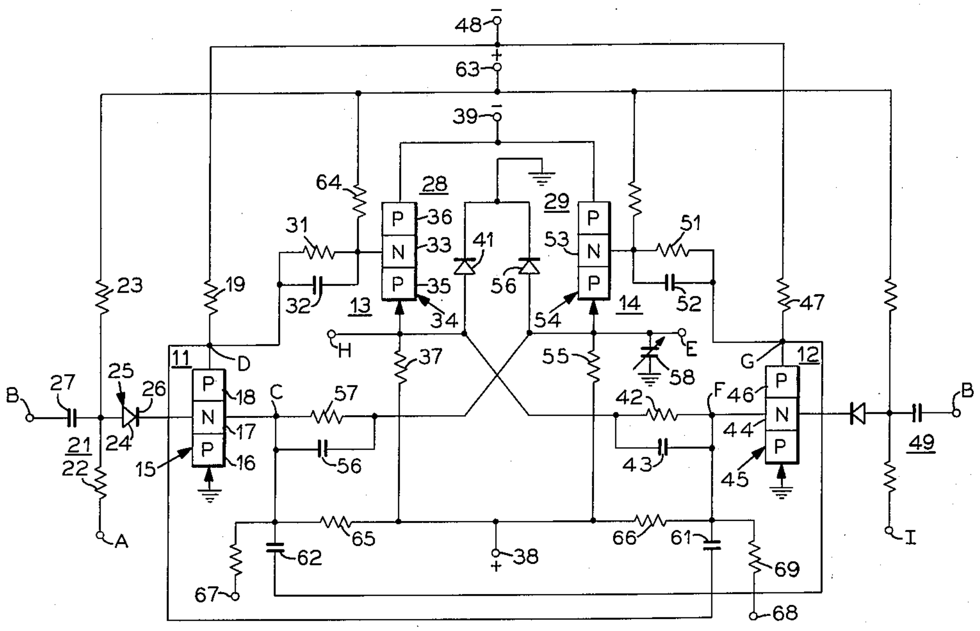
FIG. 1 is a schematic circuit diagram of a four element transistor trigger constructed in accordance with the present invention.

Referring to FIG. 1, there is shown a preferred embodiment of a trigger circuit incorporating the present invention. This trigger includes four elements: inverters 11 and 12 and emitter followers 13 and 14. Inverter 11 includes a junction type transistor 15 having an emitter 16, a base 17 and a collector 18. The emitter 16 is grounded while the collector 18 is connected through a resistor 19 to a source of negative potential. Inputs to inverter 11 are shown schematically connected at either side of the base 17. One input to inverter 11 is by way of "AND" circuit 21. "AND" circuit 21 is a coincidence circuit adapted to transfer short duration positive pulses. With terminal A at a negative potential, the voltage divider made up of resistors 22 and 23 maintains the anode 24 of diode 25 at a potential below its cathode 26. Thus, positive-going pulses transferred from terminal B through condenser 27, upon a positive-going wave front appearing at terminal B, are blocked by diode 25. If, however, a positive potential is applied to terminal A, anode 24 is near the potential of cathode 26 and positive-going pulses from condenser 27 are applied through diode 25 to the base 17 of transistor 15. The base of transistor 15 is also connected to a terminal C.

The output of inverter 11 is taken from a terminal D to the input of emitter follower 28. The output from terminal D is coupled through resistor 31, having condenser 32 connected thereacross, to the base 33 of transistor 34. Transistor 34 is the major component of emitter follower 28 and this transistor 34 has an emitter 35 and a collector 36 as well as the base 33. The emitter 35 is connected through resistor 37 to a source of positive potential indicated at terminal 38. The collector of transistor 34 is connected to a source of negative potential indicated at terminal 39. When a negative potential is applied to base 33, transistor 34 conducts and a voltage drop appears across resistor 37. In this conductive state, the output of terminal H is at the negative level. When a relatively positive potential is applied to base 33, transistor 34 is non-conducting and the positive potential from terminal 38 appears at the output H. The emitter of transistor 34 is also connected through diode 41 to ground potential. Thus, the emitter 35 is clamped so that it cannot rise in potential above ground potential. Emitter 35, the output of the emitter follower, is also connected through resistor 42, having a condenser 43 in parallel therewith, to the base 44 of transistor 45 which transistor 45 is the major component of inverter 12. Transistor 45 has a grounded emitter and a collector 46 connected through resistor 47 to a source of negative potential indicated at terminal 48. This terminal 48 is the same source of negative potential to which resistor 19 of inverter 11 is connected. Inverter 12 is identical in construction with inverter 11. Inverter 12 has an input through "AND" circuit 49, which "AND" circuit is identical in construction with "AND" circuit 21. The output of inverter 12 is taken from the collector at terminal G and fed through resistor 51 having condenser 52 in parallel therewith to the base 53 of transistor 54 which transistor 54 forms the major component of emitter follower 29. Transistor 54 has its emitter connected through resistor 55 to the positive source of potential at terminal 38. The collector of transistor 54 is connected to the negative source of potential at terminal 39.

Thus, when transistor 54 is in a conductive state a potential drop appears across resistor 55 so that the emitter of transistor 54 is at the negative potential. When transistor 54 is cut off, its emitter goes toward the positive potential of terminal 38. The emitter of transistor 54 is also clamped so that it may not rise above ground potential by diode 56. The emitter of transistor 54 is also connected through resistor 57, having condenser 58 connected thereacross, to the base 17 of transistor 15. A variable capacitive load is indicated connected to the output terminal E of emitter follower 29.

In order to form a trigger capable of binary operation, the output terminal H may be connected to the input terminal A of "AND" circuit 21, and the output terminal E may be connected to the terminal I of "AND" circuit 49. In this condition the same pulses are applied to the terminals B of "AND" circuit 21 and 49. With such connections, each time a pulse is applied to terminals B, the trigger will change its stable state from one of the inverters being in a conductive condition to the other of the inverters being in a conductive condition.

In operation, let us assume, that first transistor 15 is in a conductive state, and let us further assume that a pulse is applied to terminals B. The pulse applied to terminal B will be taken across condenser 27 and produce a positive-going spike at the base 17 of transistor 15. This positive-going spike will momentarily cut off conduction through transistor 15 and cause terminal D to go in the negative direction. As terminal D goes in the negative direction, this negative potential is applied to the base 33 of emitter follower 28. Negative potential at base 33 causes transistor 34 to conduct and thus causes the potential at terminal H to go to the negative level. The output of emitter follower 28 is taken from terminal H through resistor 42 and condenser 43 to the base 44 of inverter 12. This negative potential causes transistor 45 to conduct to produce a positive-going potential at terminal G. Potential at terminal G is coupled to the base 53 of transistor 54 to cause transistor 54 to be non-conductive and to cause a positive potential to appear at its emitter. This positive potential is connected back to the base 17 of transistor 15 to thus maintain transistor 15 in its non-conductive state. The trigger will remain in this stable condition until a positive-going pulse is applied to the base 44 of transistor 45, at which time transistor 45 will be cut off, and, in a manner similar to that described above, transistor 15 will again resume its conductive state. This operation of changing conductive states on each input pulse will continue. It should be noted that with terminal H connected to terminal A of "AND" circuit 21, when transistor 15 is in its conductive state a positive potential appears at terminal H, which terminal H when connected to terminal A maintains "AND" circuit 21 in a condition to pass a pulse from terminal B. When transistor 15 is in the non-conductive state, the potential at terminal H will be at the negative level and applied to terminal A will block any pulses from terminal B passing through diode 25 to the base 17 of transistor 15. The connections for inverter 12 are similar, and a positive-going spike is allowed to reach the base 44 of transistor 45 only when transistor 45 is in its conductive state.

Figure 2:
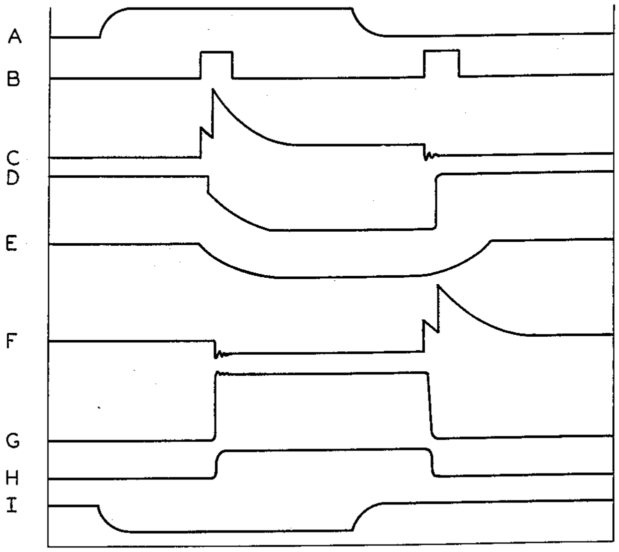
FIG. 2 is a showing of waveforms, to a common time base, occurring at various points throughout the circuit of FIG. 1.

Referring to FIG. 2, the waveforms are indicated by the same letter as the terminals of FIG. 1 on which they appear. Referring again to FIG. 1, it is seen that a condenser 61 is connected between terminal D at the output of inverter 11 to the terminal F at the base of transistor 45 of inverter 12. It is also seen that a condenser 62 is connected between the output of inverter 12 at terminal G and the terminal C at the base of transistor 15 of inverter 11. The provision of these last two coupling means provide the improved results obtained with the present trigger. Referring to FIG. 1 and FIG. 2, it is seen that a gate indicated at A in FIG. 2 is applied to terminal A of "AND" circuit 21 and that during the time of this gate a pulse may appear on terminal B. With the assumption that transistor 15 is now at the conductive state the pulse appearing at terminal B, shown at B in FIG. 2, causes a positive spike to appear at the base 17 of transistor 15. This positive spike is the first rise shown at C in FIG. 2, and after reaching an initial level the potential begins to drop at the base of transistor 15. However, the coupling between the output terminal D of inverter 11 through condenser 61 to the input of inverter 12 and the coupling back from the output terminal G of inverter 12 through condenser 62 to the input C of inverter 11 causes the second rise in potential exhibited at C in FIG. 2. It is noted that the amplifying characteristics of the inverters are brought into play to give a very large signal at this time. The time between the initial rise and the rise occasioned by the coupling back to terminal C is due to the switching time required by transistor 15 and 45. Since this time is kept short by the direct paths through condensers 61 and 62 the trigger may be switched rather quickly. The initial rise at the input of transistor 11 remains up for a sufficient length of time to allow the transistors 15 and 45 to switch and apply a potential back to terminal C. However, if the additional time needed to switch transistors 34 and 54 were brought into the circuit before any feedback occurred, then the potential at the base 17 of transistor 15 might well drop below the level required to effect the complete switch of the trigger. The transient wave occurring at the base of transistor 15 is coupled through condenser 61 to the base of transistor 45 and from the output of transistor 45 back to condenser 62 to the base of transistor 15. This transient is sufficient to switch these two transistors and the transient provided by the coupling through condensers 61 and 62 provides another transient to the base of transistor 15 of sufficient duration to allow the trigger to quickly switch. With a loading on the output of one of the emitter followers the time required for a signal to be brought through the emitter follower and to the base of the transistor of the inverter stage might well be too long to allow the trigger to switch. Moreover, the time required to bring a sufficient output level from the emitter follower back to the input of the inverter stage would vary in accordance with the loading on the output line. Thus the trigger might operate for some conditions of loading and fail for others. With the provision of the intermediate or auxiliary paths through condensers 61 and 62 the trigger may be made to operate properly regardless of heavy loading and regardless of heavy unbalance of the loading on the output of emitter follower 29 with respect to the loading on the output of emitter follower 28. The waveform shown at D in FIG. 2 reflects the heavy capacitive loading of capacitor 58 at the output of emitter follower 29. It is noted, however, that during the time that the effects of this loading are most pronounced the voltage supplied back through condensed 62 to the base 17 is also effective. The waveform at E in FIG. 2 is the output from emitter follower 29 with the heavy loading of capacitor 58 while the waveform at H in FIG. 2 shows the output of emitter follower 28 without heavy loading. In either of these cases, the trigger will switch in its proper manner. The waveform at F in FIG. 2 is that at the base of transistor 45 of inverter 12 and is produced in the same manner as described above for the waveform at C of FIG. 2, that is, the connections to point F with respect to transistor 45 are the same as the connections to C with respect to transistor 15. The waveform shown at G in FIG. 2 corresponds to the waveform shown at D in FIG. 2, the waveform at G being the output of inverter 12 while the waveform at D being the output of inverter 11. It is noted that the waveform at G in FIG. 2 is not affected by a heavy loading at the output of emitter follower 28 as is the waveform at D. The waveform at I in FIG. 2 is the waveform applied to terminal I of "AND" circuit 49. This waveform at I with the trigger connected as suggested above, would be altered to be the same as that shown at E. Likewise with the connection of the trigger for a binary operation the waveform for terminal A at "AND" circuit 21 would be changed to be that shown at H in FIG. 2.

It should be noted that the biasing of the base 33 of transistor 34 is by way of the voltage divider network between a source of positive potential shown at terminal 63 through resistor 64 and through resistors 31 and 19 to the source of negative potential shown at terminal 48. The biasing of the base 53 of transistor 54 is by a similar circuit including resistors 51 and 47. The biasing of the base of transistor 15 is by way of a voltage divider between the positive source of potential shown at terminal 38 and the emitter of transistor 54. The emitter of transistor 54, it will be recalled, is clamped so that it may not rise above ground potential by diode 56. The voltage divider network is thus made up of resistors 65 and 57 and diode 46 of transistor 54. The base of transistor 45 is biased in a similar manner by means of transistor 54, diode 41, resistor 42, and resistor 66.

Other than changing the conductive state of the trigger by means of pulses applied to the terminals B, the trigger may be set or reset as desired by the application of a negative-going pulse to either terminal 67 or 68 depending on which state it is desired to set the trigger into. For example, a negative pulse applied to terminal 68 will be applied through resistor 69 to the base of transistor 45 to cause transistor 45 to go into the conductive state and thus cause transistor 15 to be non-conductive regardless of the previous states of the two inverters. In a similar manner the trigger may be set in the other state by the application of a negative-going pulse to the terminal 67.

From the foregoing it may be seen that the provision of condensers 61 and 62 connected as described above provides parallel coupling paths with the coupling paths provided by emitter followers 38 and 29 so that the switching time of emitter followers 28 and 29 may be passed in order that the trigger may be switched in a rapid and positive manner.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A trigger circuit comprising; first and second PNP transistors each having an emitter connected to a fixed potential level, a base, and a collector connected through a resistor to a source of potential negative with respect to said fixed potential; third and fourth PNP transistors each having an emitter connected through a resistor to a source of potential, a base, and a collector connected to a source of potential negative with respect to said fixed potential; means coupling the collector of said first transistor with the base of said third transistor; means coupling the collector of said second transistor with the base of said fourth transistor; a resistor and capacitor connected in parallel between the emitter of said third transistor and the base of said second transistor; a resistor and capacitor connected in parallel between the emitter of said fourth transistor and the base of said first transistor; a capacitor connected between the collector of said first transistor and the base of said second transistor; and capacitor connected between the collector of said second transistor and the base of said first transistor.

2. Apparatus according to claim 1 further characterized by the provision of means connected to the bases of said first and second transistors for changing the state of said trigger circuit.

3. Apparatus according to claim 1 further characterized by the provision of means for applying pulses to the bases of said first and said second transistors to change the stable state of said trigger circuit.

References Cited in the file of this patent

UNITED STATES PATENTS

| | | |
|---|---|---|
| Re. 23,770 | Bergfors | Jan. 12, 1954 |
| 2,719,228 | Auerbach, et al. | Sept. 27, 1955 |
| 2,759,104 | Skellett | Aug. 14, 1956 |
| 2,825,822 | Huang | Mar. 4, 1958 |
| 2,827,574 | Schneider | Mar. 18, 1958 |
| 2,835,828 | Vogelsong | May 20, 1958 |
| 2,846,583 | Goldfischer et al. | Aug. 5, 1958 |

OTHER REFERENCES

Turner: Transistors, Gernsback Library, Inc., © 1954, pp. 83–86.

Publication (1)—"Transistor Flip-Flops for Digital Computers," Electronics Buyers Guide, June 1957, pp. R–24, R–25.